United States Patent [19]

Ohtsuka et al.

[11] Patent Number: 5,090,269
[45] Date of Patent: Feb. 25, 1992

[54] SYSTEM FOR AUTOMATICALLY CONTROLLING TRANSMISSION FOR VEHICLES

[75] Inventors: Masuhiro Ohtsuka; Hiromi Kono, both of Higashimatsuyama, Japan

[73] Assignee: Diesel Kiki Co., Ltd., Tokyo, Japan

[21] Appl. No.: 537,599

[22] Filed: Jun. 14, 1990

[30] Foreign Application Priority Data

Jun. 15, 1989 [JP] Japan .................. 1-150509

[51] Int. Cl.$^5$ .................................. B60K 41/04
[52] U.S. Cl. .......................... 74/861; 74/335; 74/856; 74/866; 364/424.03; 364/424.1
[58] Field of Search ............ 74/856, 861, 866, 335; 364/424.03, 424.1

[56] References Cited

U.S. PATENT DOCUMENTS

| | | | |
|---|---|---|---|
| 4,126,061 | 11/1978 | Fry | 74/866 |
| 4,393,732 | 7/1983 | Suzuki et al. | 74/866 |
| 4,398,258 | 8/1983 | Naitoh et al. | 364/424.03 |
| 4,541,050 | 9/1985 | Honda et al. | 364/424.03 |
| 4,561,055 | 12/1985 | McKee | 74/866 X |
| 4,583,171 | 4/1986 | Hara et al. | 74/861 X |
| 4,597,052 | 6/1986 | Matsuda | 364/424.03 X |
| 4,610,179 | 9/1986 | Parker | 364/424.1 X |
| 4,702,127 | 10/1987 | Cote | 74/335 X |
| 4,922,769 | 5/1990 | Tury | 74/335 X |
| 4,951,205 | 8/1990 | Lowe et al. | 364/424.03 X |
| 4,965,735 | 10/1990 | Holbrook et al. | 74/866 X |

FOREIGN PATENT DOCUMENTS

| | | | |
|---|---|---|---|
| 59-52306 | 3/1984 | Japan | 364/424.03 |
| 61-157441 | 7/1986 | Japan | |

Primary Examiner—Richard Lorence
Assistant Examiner—David E. Henn
Attorney, Agent, or Firm—Pollock, Vande Sande & Priddy

[57] ABSTRACT

In an automatic transmission system having a selector and a generator responsive to the operation of the selector for generating electric information indicating the operation condition of the selector, the nature of the malfunction or trouble arising in the generator is discriminated on the basis of the change in the electric information. This discrimination may be made as to whether or not there is a malfunction condition wherein no information is obtained for any set position, whether or not there is a malfunction condition wherein the information indicating a specific position is always produced. When there is a malfunction therein, the position set by the selector is assumed by taking into account the nature of the malfunction, making it possible to control the gear-shift operation even if there is malfunction.

8 Claims, 10 Drawing Sheets

SYSTEM FOR AUTOMATICALLY CONTROLLING TRANSMISSION FOR VEHICLES

BACKGROUND OF THE INVENTION

1. Field of the Invention

The present invention relates to an automatic transmission system for vehicles, in which the gear-shift mode is determined in accordance with the position selected by a selector lever.

2. Description of the Prior Art

Conventional automatic transmission systems for vehicles in which the gear-shift mode is determined in response to a signal indicating the position of the selector lever are widely used. In such type of automatic transmission system the selector lever is coupled with a position detector comprising, for example, variable resistors, switches or the like, and an electric signal produced by the position detector indicating the position of the selector lever is applied to a control unit of the automatic transmission system, whereby the gear-shift mode of the system is determined in accordance with the set position of the selector lever. Accordingly, it becomes impossible to control the change of the gear-shift mode if a malfunction or trouble arises in the elements forming the position detector or the wiring system thereof.

The overcome this disadvantage, Japanese Patent Application Public Disclosure No. 157441/86 discloses an arrangement, for example, in which a position detector is provided with a plurality of position switches including two reverse position switches for indicating the reverse mode when the two reverse position switches are simultaneously turned on and the transmission can be shifted to the neutral or one of the forward positions in the case of a malfunction of either or both of the position switches, namely at any time other than when the two reverse position switches are simultaneously turned on.

However, with the proposed arrangement, in the case where a malfunction arises in the position detector just after the selector lever is positioned at the neutral (N) position, the neutral (N) position is determined as the position just before the occurrence of the malfunction, so that the neutral position is selected in priority to the other positions even if the drive (D) position for automatic gear-shifting operation is selected by the driver. This will make it impossible to drive off the vehicle.

SUMMARY OF THE INVENTION

It is therefore an object of the present invention to provide an improved automatic transmission system.

It is another object of the present invention to provide an automatic transmission system which is capable of selecting a suitable gear-shift mode in response to the operation of the mode selecting member even if the system for detecting the position of the mode selecting member has malfunctioned.

According to the present invention, in an automatic transmission system having a setting member for setting a gear-shift mode of a transmission, a data providing system coupled with the setting member for providing a mode signal indicating the gear-shift mode of the transmission, and a control unit responsive to the mode signal for carrying out the gear-shifting operation of the transmission in a gear-shift mode according to the position set by the setting member, the data providing system has a generating means coupled with the setting member for generating electric information indicating the operation condition of the setting member, a malfunction detecting means responsive to the electric information for detecting whether or not there is a malfunction in the generating means, a discriminating means for discriminating the condition of the malfunction, if any, in response to the change in the electric information, and an output means responsive to the generating means, the malfunction detecting means and the discriminating means for providing the mode signal to the control unit whereby the gear-shift operation is carried out in the control unit in the mode indicated by the mode signal.

When some malfunction arises in an element or the elements, such as switches, variable resistors, wiring system and the like in the generating means, this is detected by the malfunction detecting means on the basis of the electric information or data produced by the generating means. Furthermore, the nature of the malfunction or trouble arising in the generating means is discriminated by means of the discriminating means on the basis of the change in the electric information. For example, it is checked by the discriminating means whether or not there is a malfunction condition wherein no information is obtained for any position set by the setting member, or whether or not there is a malfunction condition wherein the information indicating a specific position is always produced regardless of the change in the position set by the setting member, whereby it can be determined how the malfunction has arisen. When there is a malfunction in the generating means, the position set by the setting member is assumed by the output means by taking into account the nature of the malfunction detected by the discriminating means, making it possible to control the gear-shifting operation in accordance with the operation of the setting member even if there is a malfunction in the generating means.

The invention will be better understood and other objects and advantages thereof will be more apparent from the following detailed description of preferred embodiments with reference to the accompanying drawings.

DETAILED DESCRIPTION OF THE PREFERRED EMBODIMENTS

Figure 1:
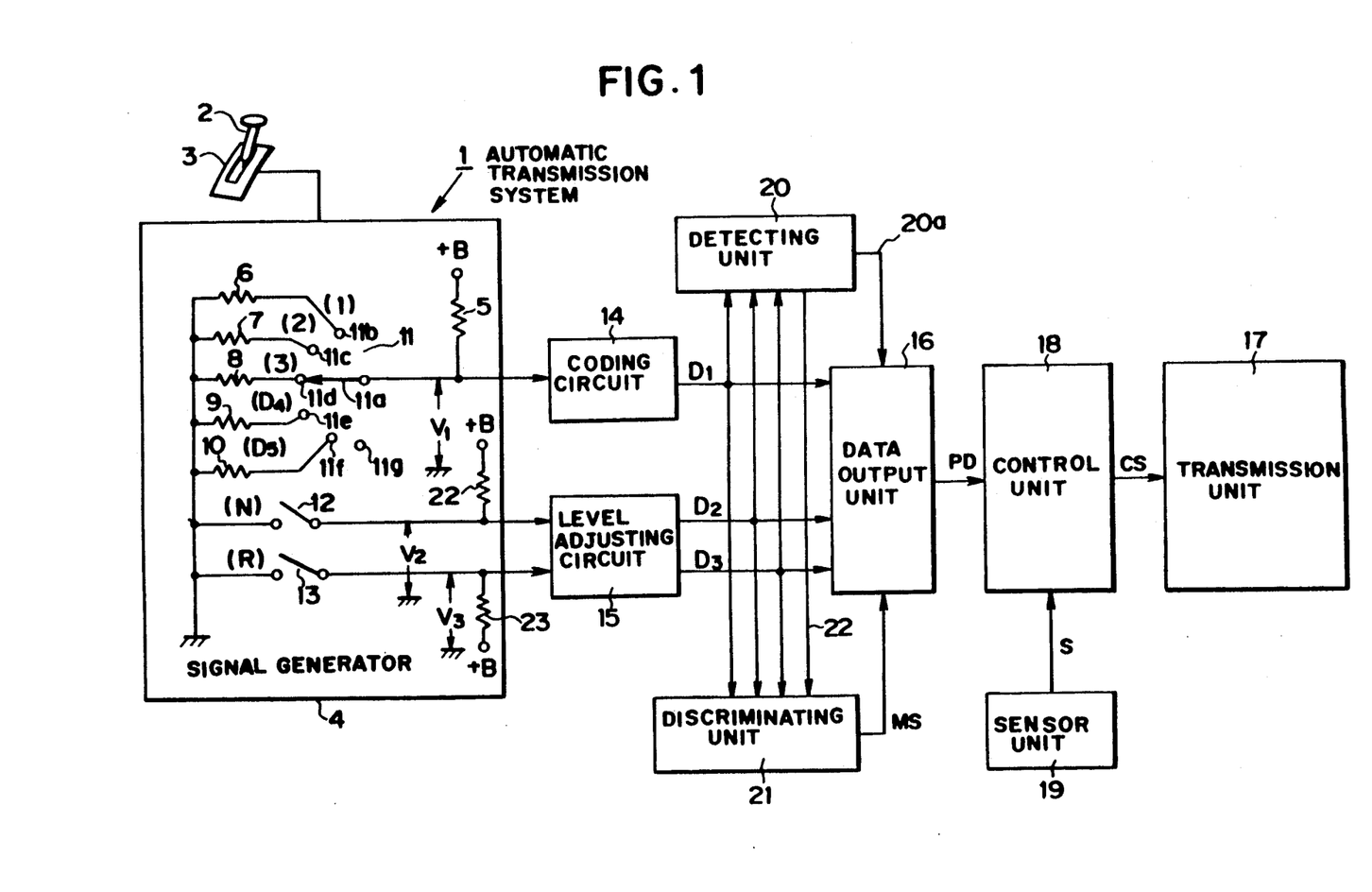
FIG. 1 a block diagram showing an embodiment of an automatic transmission system according to the present invention.

FIG. 1 is a block diagram illustrating an embodiment of a vehicle automatic transmission system according to the present invention. An automatic transmission system 1 for vehicles is provided with a selector 3 having a selector lever 2 and a signal generator 4 coupled with the selector 3 for generating an electric signal indicative of the position set in the selector 3, that is, the position of the selector lever 2.

In the embodiment shown in FIG. 1 the signal generator 4 is provided with a change-over switch 11 having a plurality of fixed contacts 11b to 11g and a movable contact 11a which is operated in accordance with the movement of the selector lever 2. The fixed contacts 11b to 11f correspond to a first speed (1st) position, a second speed (2nd) position, a third speed (3rd) position, a first drive (D4) position and a second drive position (D5) of the selector 2, respectively, and the movable contact 11a makes contact with one of the fixed contacts in accordance with the position of the selector lever 2. The movable contact 11a is connected through a resistor 5 with a voltage source +B and the fixed contacts 11b to 11f are grounded through resistors 6 to 10, respectively, which have different values of resistance, so that a first voltage signal $V_1$ whose level depends upon the change-over condition of the change-over switch 11, can be obtained from the movable contact 11a. The level of the first the voltage signal $V_1$ is Va for the 1st position, Vb for the 2nd position, Vc for the 3rd position, Vd for the D4 position, and Ve for the D5 position, respectively, as determined by selecting the values of the resistors 6 to 10.

The signal generator 4 is further provided with a neutral switch 12 for producing a second voltage signal $V_2$ and a reverse switch 13 for producing a third voltage signal $V_3$ The neutral switch 12 is closed when the selector lever 2 is set at its neutral (N) position, so that the second voltage signal $V_2$ of ground level is produced. The reverse switch 13 is closed when the selector lever 2 is set at its reverse (R) position, so that the third voltage signal $V_3$ of ground level is produced. The movable contact 11a should be in contact with the fixed contact 11g when either switch 12 or 13 is closed.

Figure 2:
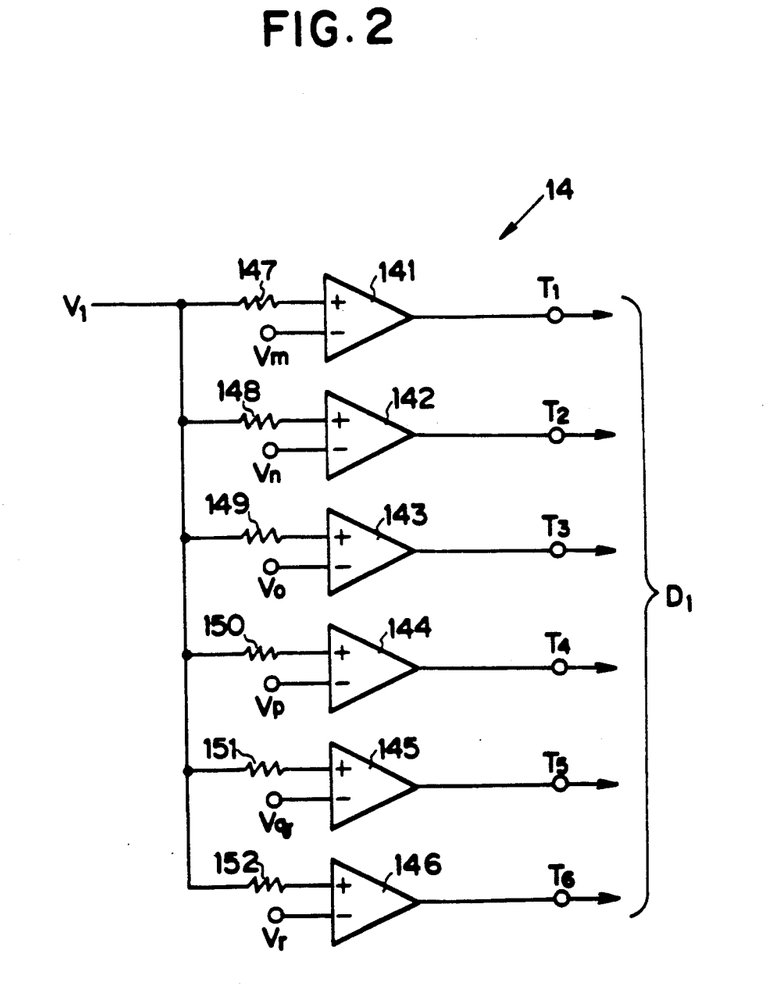
FIG. 2 is a detailed circuit diagram of the coding circuit shown in FIG. 1.

To obtain a first data $D_1$ indicative of the position of the movable contact 11a, the first voltage signal $V_1$ is applied to a coding circuit 14 including six voltage comparators 141 to 146 as shown in FIG. 2.

Referring to FIG. 2, the input terminal of each voltage comparator 141 to 146 receives the first voltage signal $V_1$ through the associated one of input resistors 147 to 152, and the inverted input terminal thereof receives one of reference voltages Vm to Vr from the voltage source (not shown). The levels of these reference voltages Vm to Vr are determined as follows:

$+B > Vm > Va > Vn > Vb >$
$Vo > Vc > Vp > Vd > Vd > Vg > Ve > Vr$

Thus, when, for example, the movable contact 11a is in contact with the fixed contact 11b because the selector lever 2 is positioned at the 1st position, the data $D_1$ is produced as a binary code (011111). Similarly, the first data $D_1$ becomes (111111) when the movable contact 11a is in contact with the fixed contact 11g because of the selection of N position or R position. Thus, the relationship between the selected position and the coded binary data are as follows.

TABLE 1

| SET POSITION OF SELECTOR LEVER | BINARY CODE ($D_1$) |
| --- | --- |
| 1st | (011111) |
| 2nd | (001111) |
| 3rd | (000111) |
| D4 | (000011) |
| D5 | (000001) |
| N or R | (111111) |

The first data $D_1$ of six bits is derived from the output terminals $T_1$ to $T_6$ as parallel data of six bits.

On the other hand, returning to FIG. 1, the second and third voltage signals $V_2$ and $V_3$ are applied to a level adjusting circuit 15 which outputs them as second data D and third data $D_3$, respectively. Thus, the second data $D_2$ is "0" since the neutral switch 12 is closed when the selector lever 2 is positioned at its N position, and the third data D is "0" when the reverse switch 13 is closed when the selector lever 2 is positioned at its R position.

Data $D_1$, $D_2$ and $D_3$ are applied to a data output unit 16 to discriminate which position is currently selected by the selector lever 2 on the basis of the data $D_1$ to $D_3$, and data PD indicative of the gear-shift mode according to the operation of the selector lever 2 is produced.

For conducting a substitute operation to provide appropriate data PD even if a malfunction arises in the signal generator 4, including the wiring system for connecting the signal generator 4 with another device, the automatic transmission system 1 comprises a detecting unit 20 and a discriminating unit 21.

The detecting unit 20 is responsive to the data D to $D_3$ and determines whether or not there is a malfunction in the signal generator 4 for generating signals indicative of the position set by the selector lever 2. In this embodiment this determination is carried out on the basis of determining as to whether or not two or more signals of the first to third output signals $V_1$ to $V_3$ are simultaneously in their respective significant states, which will be referred to as "a multi-assignment state", and determining as to whether or not all of the signals $V_1$ to $V_3$ are simultaneously not in these respective significant states, which will be referred to as "a no-assignment state". The former state is a typical malfunction state caused by, for example, sticking of the switch contact in a closed state, and the latter is a typical malfunction state caused by, for example, a broken wire or sticking of the switch in the open state. In this case, it is assumed that the first voltage signal $V_1$ is not in its significant state when the contents of the data $D_1$ is (111111) or (000000). As to the voltage signals $V_2$ and $V_3$, the significant state of $V_2$ is established when the data $D_2$ is "0", and that of $V_3$ is established when the data $D_3$ is "0".

Figure 3:
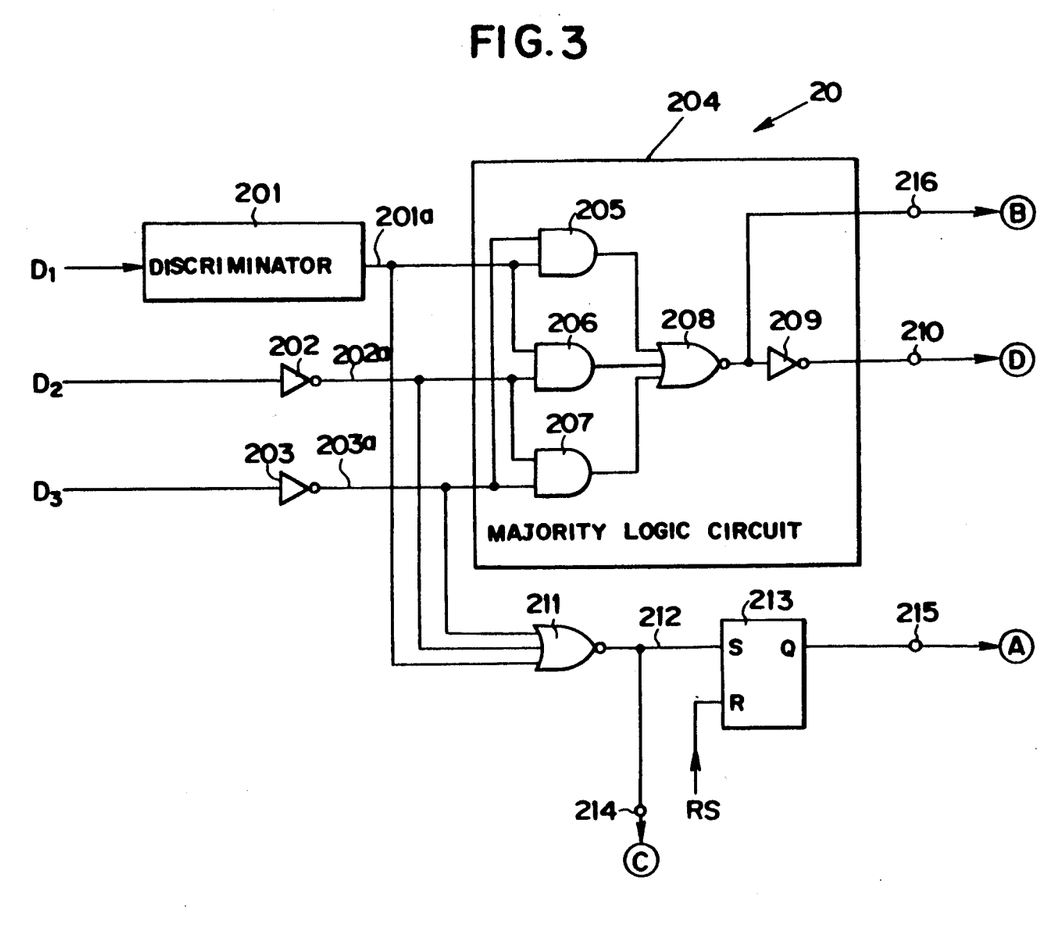
FIG. 3 is a detailed circuit diagram of the detecting unit shown in FIG. 1.

FIG. 3 shows a detailed circuit diagram of the detecting unit 20. A discriminator 201 discriminates in response to the data $D_1$ whether or not the data $D_1$ is in the significant state, and the level on an output line 201a thereof assumes the high level state only when the significant state of the first voltage signal $V_1$ is established. The discriminator 201 may be realized by a logic circuit arrangement including, for example, data comparators for comparing the data D with data (111111) and (000000), respectively. The data $D_2$ is applied to an inverter 202 to establish high level state at the corresponding output line 202a only when the level of the second voltage signal $V_2$ is in its significant state. In a similar way the data $D_3$ is applied to an inverter 203 to establish high level state at the corresponding output line 203a for its significant state.

To detect whether or not two or more of the voltage signals $V_1$ to $V_3$ are in the significant state simultaneously, in other words, whether or not there is a malfunction of the multi-assignment state type, the output lines 201a, 202a and 203a are connected with the inputs of a majority logic circuit 204 which is formed as a well-known majority logic circuit by the use of AND gates 205 to 207, a NOR gate 208 and an inverter 209. As is well known, the level of the terminal 210 becomes high only when high level states are present on two or more of the output lines 201a, 202a and 203a at the same time.

On the other hand, to detect whether or not all of the voltage signals $V_1$ to $V_3$ assume the non-significant state simultaneously, in other words, to detect whether or not there is a malfunction of the no-assignment state type, there is provided a three input NOR gate 211 to the inputs of which the output lines 201a, 202a and 203a are connected. Since none of the levels appearing on the output lines 201a, 202a and 203a is high in the case of the malfunction of the no-assignment state type, the level of the output line 212 of the NOR gate 211 becomes high. The output line 212 is connected with a set terminal S of a flip-flop 213 having a reset terminal R to which a reset signal RS is applied from a reset circuit (not shown) when the power switch (not shown) is turned ON. Accordingly, the level of the output terminal Q of the flip-flop 213 is changed from low to high in response to the occurrence of a high level signal on the output line 212, and the high level state at the output terminal Q is maintained thereafter even if the level of the output line 212 returns to low from high. The level of the output line 212 appears on a terminal 214 and the level of the output terminal Q appears on a terminal 215. The output level of the NOR gate 208 appears on a terminal 216.

Returning to FIG. 1, the discriminating unit 21 is responsive to the data $D_1$ to $D_3$ and the signals received through a signal channel 22 from the detecting unit 20, and discriminates the nature of any trouble happening in the signal generator 4. This determining is carried out as follows. In the case of a malfunction of the multi-assignment state type, which will happen when, for example, the contact sticks in its closed state, the set position of the selector level 2 at which the trouble has arisen by detecting the position at which only one voltage signal among the voltage signal $V_1$ to $V_3$ assumes the significant state. On the other hand, in the case of a malfunction of the no-assignment state type, which will happen when, for example, the switch sticks its open state or a wire breaks, the set position of the selector lever 2 at which the trouble has arisen is identified by detecting the position at which the expected significant output is not obtained when the selector lever 2 is operated.

Figure 4:
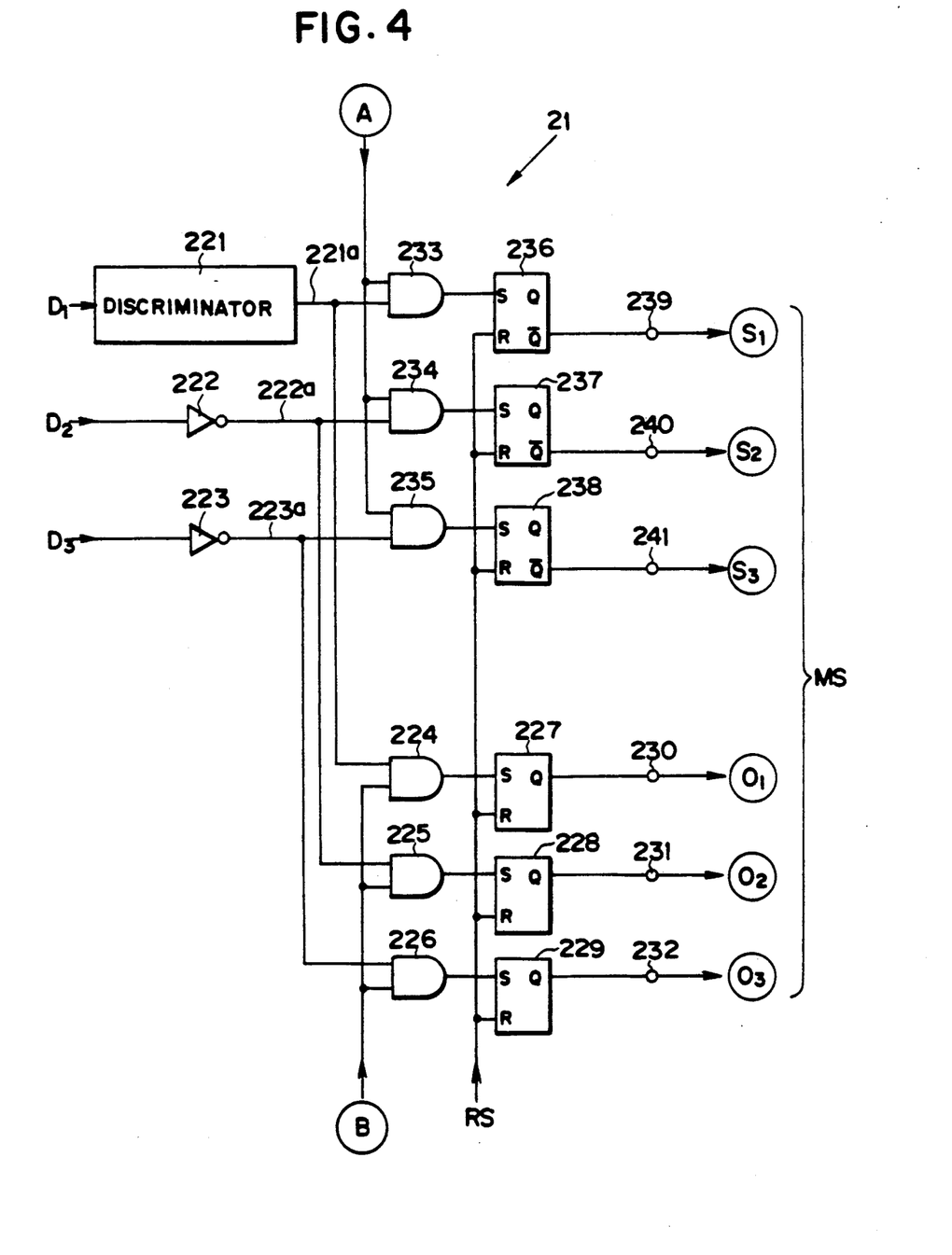
FIG. 4 is a detailed circuit diagram of the discriminating in FIG. 1.

FIG. 4 shows a detailed circuit diagram of the discriminating unit 21. A discriminator 221 discriminates in response to the data $D_1$ whether or not the data $D_1$ is in the significant state, and the level of an output line 221a thereof becomes high only when the first voltage signal $V_1$ is in its significant state similarly to the manner of the discriminator 201 of FIG. 3. The data $D_2$ is applied to an inverter 222 having an output line 222a, and the level of the output line 222a is high only for the significant state of the second voltage signal $V_2$. The data $D_3$ is applied to an inverter 223 having an output line 223a, and the level of the output line 223a is high only for the significant state of the third voltage signal $V_3$. As will be understood from the foregoing description, the discriminator 221 and the inverters 222 and 223 may be omitted if the output signal appearing on the output lines 201a, 202a and 203a in FIG. 3 are commonly used in the discriminating unit 21.

The output lines 221a, 222a and 223a are connected to one input terminal of AND gates 224 to 226, respectively and the other input terminals of the AND gates 224 to 226 are commonly connected to the output terminal 216 of the detecting unit 20 (see FIG. 3). Consequently, the other input terminals of the AND gates 224 to 226 become high only when only one significant state among the voltage signals $V_1$ to $V_3$ is detected by the detecting unit 20, and when only one output line among the output lines 221a, 222a and 223a becomes high, the corresponding one flip-flop among flip-flops 227 to 229 is set. Thus, the flip-flop corresponding to the normal output voltage signal will be set to produces a high level output from its output terminal Q. The respective Q outputs from the flip-flops 227 to 229 appear on output terminals 230 to 232.

The output lines 221a, 222a and 223a are also connected to one input terminal of AND gates 233 to 235, respectively, and the other input terminals of the AND gates 233 to 235 are connected to the output terminal 215 of the detecting unit 20 (see FIG. 3). Therefore, all of the AND gates 233 to 235 are enabled only when a malfunction of the no-assignment state type has once occurred. When a significant voltage signal is produced by the signal generator 4, the corresponding flip-flop among flip-flops 236 to 238 is set. Accordingly, for example, when the significant voltage signal $V_1$ is produced by the signal generator 4, the corresponding flip-flop 236 is set to maintain its $\bar{Q}$ output low. The flip-flops 237 and 238 also set when the significant voltage signals $V_2$ and $V_3$ are produced. In contrast, in the case where no significant voltage signal is produced as to a certain voltage signal, the corresponding flip-flop is not set so that its $\bar{Q}$ output is maintained high. As a result, information indicative of the nature of the trouble or malfunction occurring in the signal generator 4 can be derived from the terminals 230 to 232, and 239 to 241.

The signals derived from the terminals 230 to 232 and 239 to 241 are applied as a malfunction information signal MS to the data output unit 16. The flip-flops 227 to 229 and 236 to 238 are reset by the reset signal SR when the power is turned ON.

Figure 5:
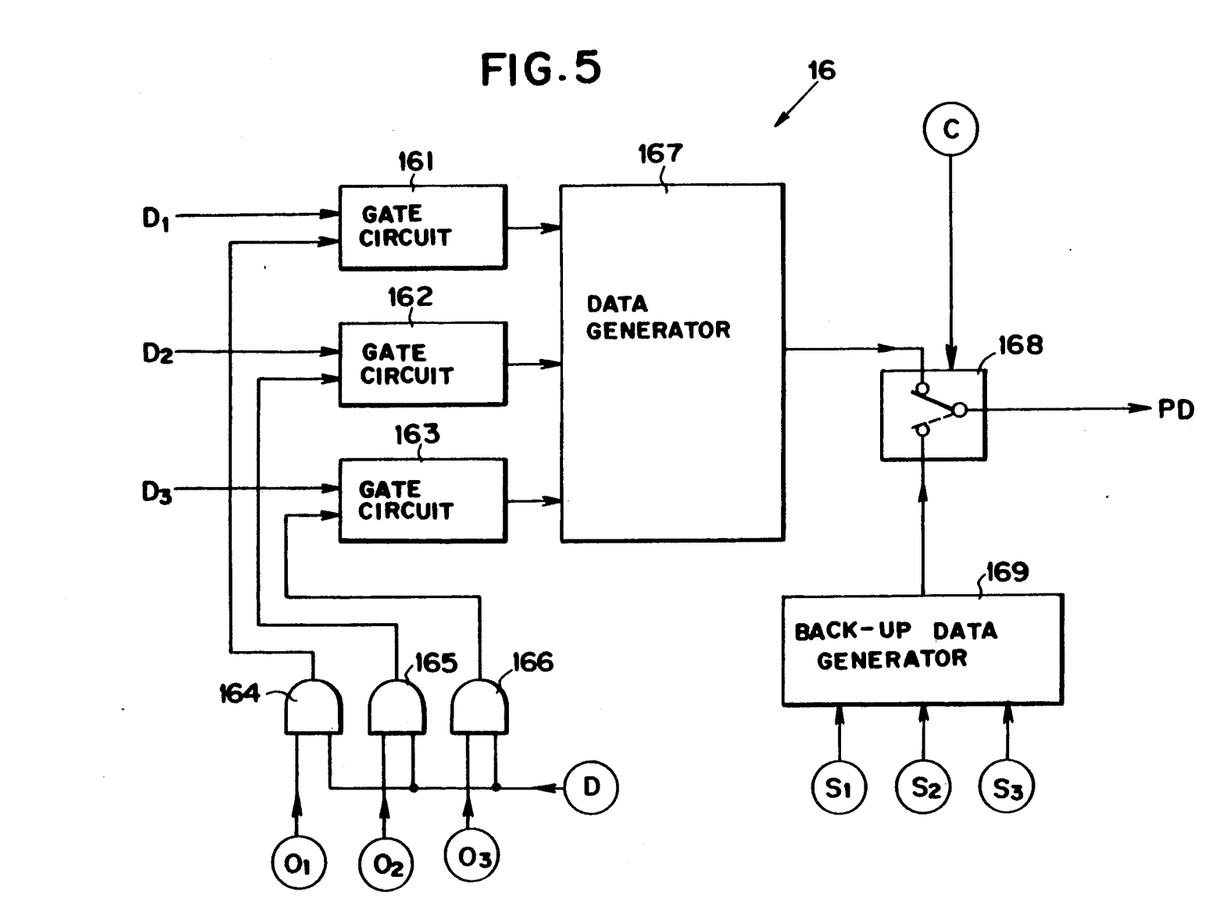
FIG. 5 is a detailed block diagram of the data output unit shown FIG. 1.

FIG. 5 shows a detailed block diagram of the data output unit 16, which comprises gate circuits 161 to 163 receiving the data $D_1$ to $D_3$, respectively. To enable or disable these gate circuits 161 to 163, there are provided AND gates 164 to 166 to one input terminal of which the output signals from the output terminals 230 to 232 of the discriminating unit 21 are applied, respectively. The signal from the output terminal 210 of the detecting unit 20 is commonly applied to the other input terminals of the AND gates 164 to 166. Each of the gate circuits 161 to 163 is responsive to the output of the corresponding AND gate to allow the input data to pass only when a low level signal is provided from the corresponding AND gate. As a result, in the case of the occurrence of a malfunction of the multi-assignment state type, the gate circuit corresponding to the erroneous data is disabled to provide only appropriate significant data to a data generator 167.

The data generator 167 is responsive to data $D_1$ to $D_3$ and generates data indicative of the gear-shift mode. The data generator 167 may be arranged as a map calculator using a read-only memory (ROM) to produce the necessary data corresponding to the input data $D_1$ to $D_3$.

The data produced by the data generator 167 is derived through a change-over switch 168 as selector data PD. The operation of the change-over switch 168 is controlled by the output signal from the output terminal 214 of the detecting unit 20 in such a way that the change-over switch 8 is switched over as shown by the solid line when the level of the output terminal 214 is low, but is switched over as shown by the broken line when the level thereof is high. Thus, when the switch 168 is switched over as shown by the broken line, substitute data produced by a back-up data generator 69 is derived as the selector data PD instead of the data from the data generator 167.

The back-up data generator 169 receives signals from the output terminals 239 to 241 to carry out the map calculation in response thereto, and produces an appropriate substitute data matched with the nature of the malfunction indicated by the signals received at that time. For example, data indicating the $D_4$ position is produced as the substitute data in the case where there is a malfunction in the first voltage signal $V_1$. When there is a malfunction in the second voltage signal $V_2$, substitute data indicating the N position is produced. When there is a malfunction in the third voltage signal $V_3$, substitute data indicating the R position is produced. Thus, in the case where a malfunction of no-assignment state type has occurred, the appropriate substitute data is selected by the switch 168 to provide it as the selector data PD to a control unit 18 when the level of the output terminal 214 is high.

Returning to FIG. 1, the control unit 18 is a conventional automatic transmission control unit arranged in the form of a microcomputer system, in which a predetermined control program for controlling a transmission unit 17 is executed. A condition signal S indicative of the operation conditions of the vehicle at each instant, including information concerning the engine speed, vehicle speed, amount of operation of an accelerator pedal and the like, is applied from a sensor unit 19 to the control unit 18. The gear-shift mode indicated by the selector data PD is selected in the control unit 18, and a control signal CS for automatically controlling the operation of the transmission 17 in the selected gear-shift mode is produced from the control unit 18 in response to the condition signal S. Finally, the gear-shift operation of the transmission 17 is automatically carried out in response to the operation condition of the vehicle in the required gear-shift mode.

With the aforesaid arrangement of the automatic transmission system 1, when there is no malfunction in the signal generator 4, the data generator 167 of the data output unit 16 is responsive to the data $D_1$ to $D_3$ and produces the selector data PD on the basis of the data $D_1$ to $D_3$. In contrast, in the case where a multi-assignment malfunction or a no-assignment malfunction is detected by the detecting unit 0, the substitute operation is carried out by the data output unit 16, and the selector data PD is produced with the assistance of the discriminating unit 21 and the detecting unit 20 as described above in detail. Thus, it is possible to select the desired gear-shift mode by the operation of the selector lever 2 even if there is a malfunction in the signal generator 4, enabling the system 1 to operate the automatic gear-shift operation appropriately, in a manner similar to normal operation.

Although an analog type signal generator is employed in the embodiment shown in FIG. 1, the present invention is also applicable to a system employing a switch type signal generator. Furthermore, the present invention can be applied to a system employing a different type of selector other than the selector 3 having a plurality of set positions arranged in line, and identical effects will be obtained in such a case.

The functions of the data output unit 16, the detecting unit 20 and the discriminating unit 21 may be realized by employing a microcomputer in which a predetermined control program is executed.

Figure 6:
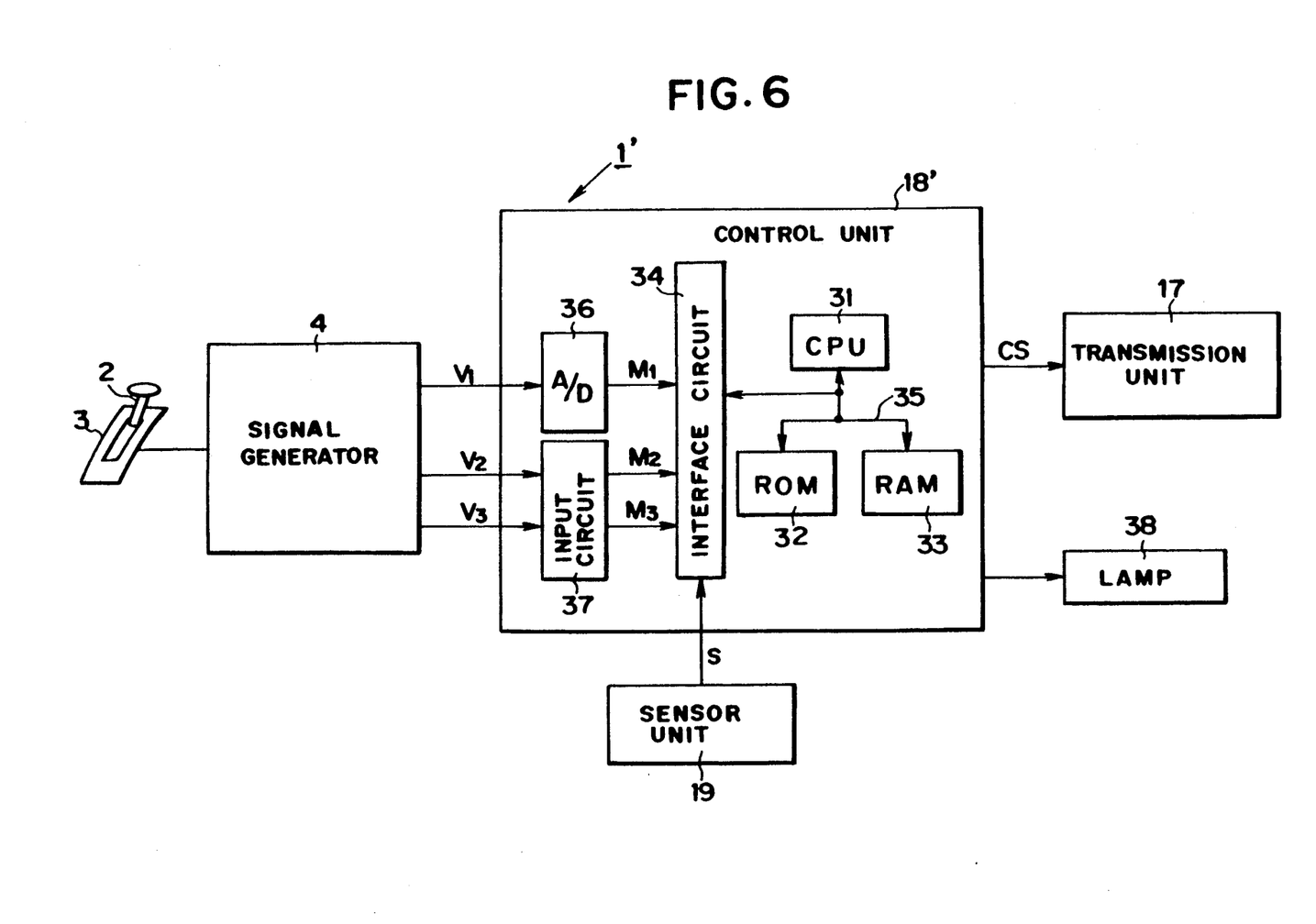
FIG. 6 a block diagram showing another embodiment of an automatic transmission according to the present invention.

FIG. 6 is a block diagram showing another embodiment of a vehicle automatic transmission system 1' according to the present invention. A control unit 18' has a microcomputer system formed by a central processing unit (CPU) 31, a read-only memory (ROM) 32, a random access memory (RAM) 33, an interface circuit 34, a bus 35 for interconnecting these components, an analog-digital converter (A/D) 36 for converting the first voltage signal $V_1$ to a corresponding digital data $M_1$, and an input circuit 37 for providing digital data $M_2$ and $M_3$ corresponding to the second and third voltage signals $V_2$ and $V_3$, respectively. Reference numeral 38 designates a lamp. In FIG. 6 the portions corresponding to portions shown in FIG. 1 are designated by the identical reference numerals and will not be explained here.

For controlling the transmission unit 17 by the control unit 18', the ROM 32 stores a conventional control program for automatically controlling the operation of the transmission unit 17, a malfunction determining program responsive to the voltage signals $V_1$ to $V_3$ for discriminating the nature of the malfunction arising in the signal generator for detecting the position of the selector lever 2, and a position determining program responsive to the voltage signals $V_1$ to $V_3$ for determining the position of the selector lever 2 by taking into account of the determining result obtained by the execution the malfunction determining program.

Figure 7A:
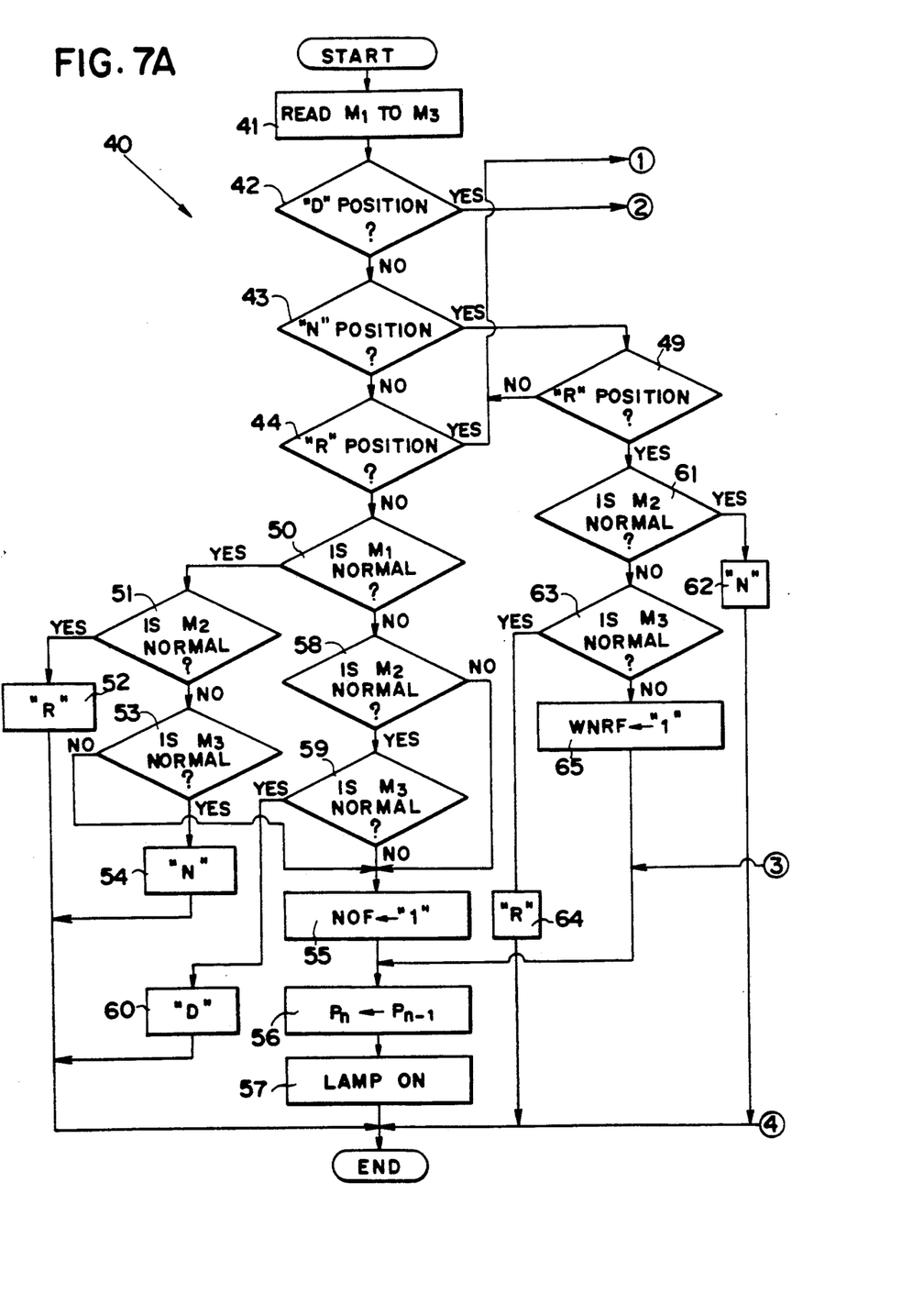
FIGS. 7A and 7B show a flowchart of a position discrimination program executed in the control unit shown in FIG. 6.
Figure 7B:
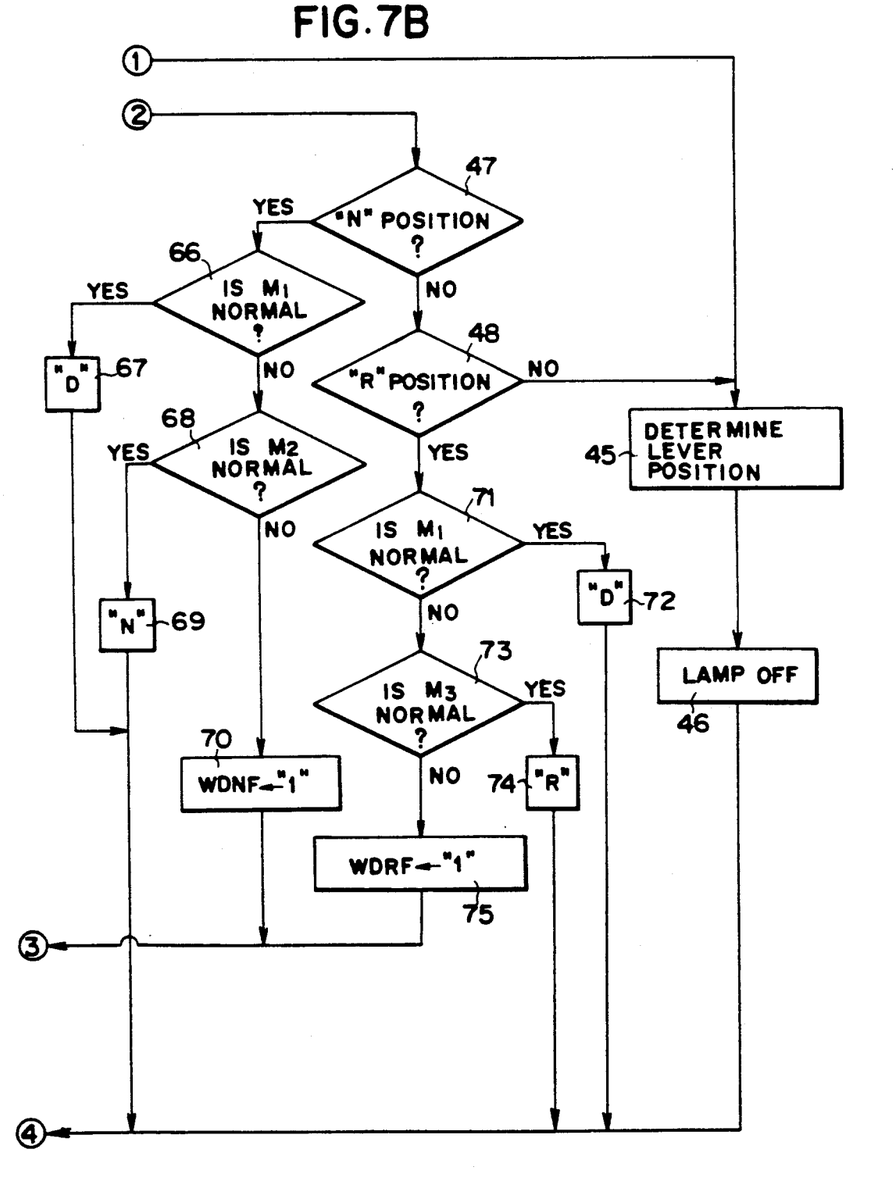

FIGS. 7A and 7B show a flowchart of the position determination program, which is executed at a predetermined time intervals. After the start of the position determination program 40, at first, the operation moves to step 41 in which the data $M_1$ to $M_3$ are read in. After this, in steps 42 to 44 it is determined on the basis of the data $M_1$ to $M_3$ which position the selector lever 2 occupies among the forward (D) positions including the 1st, 2nd, 3rd, $D_4$ and $D_5$ position, the N position and the R position. If the signal generator 4 in operating normally, only one determination in steps 42 to 44 becomes YES.

In the case where the determinations in steps 42 and 43 are NO and the determination in step 44 is YES, the operation moves to 45 wherein the position set by the selector lever 2 is determined by the use of the input data. Then, the operation moves to step 46 wherein the malfunction indicating lamp 38 is turned off, and the execution of the program 40 is terminated.

When the determination in step 42 is YES, steps 47 and 48 are executed, in which it is determined whether or not data indicative of the selection of the N or R position is applied to the control unit 18'. In the case of the absence of a malfunction in the signal generator 4, the determinations in step 47 and 48 both become NO and steps 45 and 46 are executed similar by to the former case.

When the determination in step 43 is YES, the operation moves to step 49 wherein it is whether or not data indicating the selection of the R position is read in. When there is no malfunction in the signal generator 4, the determination in step 49 becomes NO, and steps 45 and 46 are executed.

Namely, in the normal case wherein only one among the data $M_1$ to $M_3$ is significant, steps 45 and 46 are executed to determine the position of the selector lever 2 in accordance with the data $M_1$ to $M_3$.

The description will now be given to the case wherein determination in each of steps 42 to 44 becomes NO. In this case, after the determination in step 44 becomes NO, the operation moves to step 50 wherein determination is made as to whether or not the data $M_1$ is being output normally, that is, as to whether the position detection in the D position is being normally carried out. This determination is carried out on the basis of the result obtained in the execution of the malfunction determining program as will be described later.

The determination in step 50 becomes YES when it is indicated by the malfunction determining program that the detection for the D position is being carried out normally. In contrast, the determination in step 50 becomes NO when it is indicated by the malfunction discrimination program that the detection for the D position is not being carried normally. The operation moves to step 51 when the determination in step 50 is YES, and determination is made in step 51 as to whether or not the detection for the N position is being carried out normally. The determination in step 51 is YES when the detection for the N position is being carried out normally, and the operation moves to step 52 wherein it is indicated that the selector lever 2 is in the R position. After the execution of this program 40 is terminated. Namely, when it is determined that the detection for the D and N position is being carried out normally in the case where none of the data $M_1$ to $M_3$ are in the significant state, it is determined that the selector level 2 is in the R position.

The operation moves to step 53 when the determination in step 51 is NO, and determination is made in step 53 as to whether or not the detection for the R position is being carried out normally. The determination in step 53 is YES when the detection for the R position is being carried out normally, and it is indicated in step 54 that the selector lever 2 is in the N position. Then, the execution of this program 40 is terminated. The operation moves to step 55 when the determination in step 53 is NO, and a flag NOF is set indicating that it is impossible to determine in which position the selector lever 2 is located. After this, the operation moves to step 56, wherein the position $P_{n-1}$ of the selector lever 2 as determined in the preceding program cycle is set as the position $P_n$ of the selector lever 2 at this time, and the malfunction indicating lamp 38 is lighted in step 57 to indicate that the position set by the selector lever 2 cannot be as determined. Thus, the execution of this program 40 is terminated. It will sometimes occur that the determinations in steps 51 and 53 both become NO simultaneously in the case where the nature of the malfunction has not yet been determined by the malfunction discriminating program.

Description will be given to the case where the determination in step 50 is NO. In this case, the operation moves to step 58 wherein determination is made as to whether or not the detection for the N position is being carried out normally in the signal generator 4 in manner similar to the operation in step 51, and the operation moves to step 59 when the determined in step 58 is YES. It is determined in step 59 whether or not the detection for the R position is being carried out normally in the signal generator 4. It is indicated in step 60 that the selector lever 2 is in the D position when the determination in step 59 is YES, and the execution of this program 40 is terminated.

Since it is impossible to determine the position of the selector level 2 when the determination in step 58 or 59 is NO, the operation moves to step 55.

Next, description will be given to the case where the determination in step 49 is YES, that is, both data $M_2$ and $M_3$ assume their significant status simultaneously. In this case, the operation moves to step 61 wherein determination is made as to whether or not the detection for the N position is being carried out normally. The determination in step 61 is YES when the detection for the N position is being carried out normally, and it is then indicated in step 62 that the selector lever 2 is in the N position. Thus, the execution of this program 40 is terminated. The determination in step 61 becomes NO in the case where it is not determined that detection for the N position is being carried out normally, and the operation moves to step 63 wherein determined is made as to whether or not normal detection for the R position has been made. It is indicated in step 64 that the selector lever 2 is in the R position when the determination in step 63 is YES, and the execution of this program 40 is terminated. In the case where the determination in step 63 is NO, namely it is not determined that the detections for the N and R positions are both being carried out normally, since it is impossible to discriminate the position of the selector lever 2, a flag WNRF indicating such fact is set and the operation moves to step 56.

Description will now be given to the operation in the case where the determination in step 47 is YES. This condition occurs when the data $M_1$ and $M_2$ both assume significant states simultaneously, and it is determined in step 66 as to whether or not the detection for the D position is being carried out normally. It follows that the selector lever 2 is the D position when the determination in step 66 is YES, so that it is indicated in step 67 that the selector lever 2 is in the D position, and the execution of this program 40 is terminated.

In the case where the determination in step 66 is NO, determination is made in step 68 as to whether or not it the detection for the N position is being carried out normally. It is indicated in step 69 that the selector lever 2 is in the N position when the determination in step 68 is YES, and the execution of this program is terminated. It is impossible to determine the position of the selector lever 2 in the case where the determination in step 68 is NO, and a flag WDNF indicative of this impossible state is set in step 70. Then, the operation moves to step 56.

Description will be given to the operations in the case where the determination in step 48 is YES. This condition occurs when the data M and $M_3$ both assume significant states simultaneously, and it is determined in step 71 as to whether or not the detection for the D position is being carried out normally. It follows that the selector lever 2 is in the D position when the determination in step 71 is YES, so that it is indicated in step 72 that the selector lever 2 is in the D position, and the execution of this program 40 is terminated. In the case where the determination in step 71 is NO, determination is made in step 73 as to whether or not the detection for the R position is being carried out normally. It is indicated in step 74 that the selector lever 2 is in the R position when the determination in step 73 is YES, and the execution of this program is terminated. It is impossible to determined the position of the selector lever 2 in the case where the determination in step 73 is NO, and a flag WDRF indicative of this impossible state is set in step 75. Then, the operation moves to step 56.

As described above, the position determination program 40 serves to determine the position of the selector lever 2 in response to the first to third data $M_1$ to $M_3$. In this case, the position of the selector lever 2 is determined on the basis of the nature of the malfunction discriminated by the execution of a malfunction determining program 80 shown in FIGS. 8A and 8B when there is a malfunction in any one of the data $M_1$ to $M_3$. In the case where it is impossible to determine the position of the selector lever 2 because, for example, the nature of the malfunction has not yet been determined, a flag is set in accordance with the nature of the malfunction at that time, and the position of the selector lever 2 is assumed in step 56 to be that determined in the preceding program cycle.

Figure 8A:
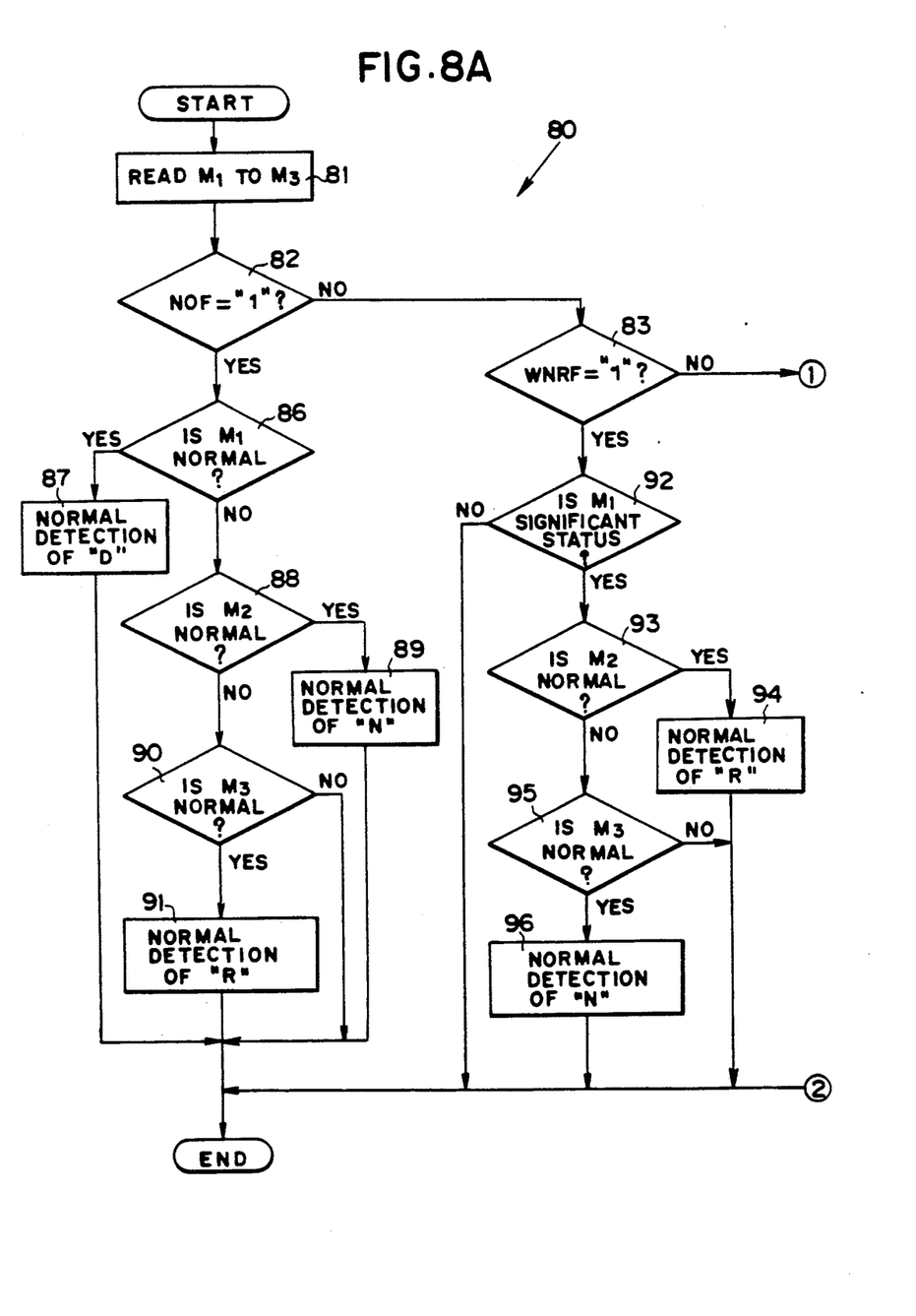
FIGS. 8A and 8B show a flowchart of a malfunction discrimination program executed in the control unit shown in FIG. 6.
Figure 8B:
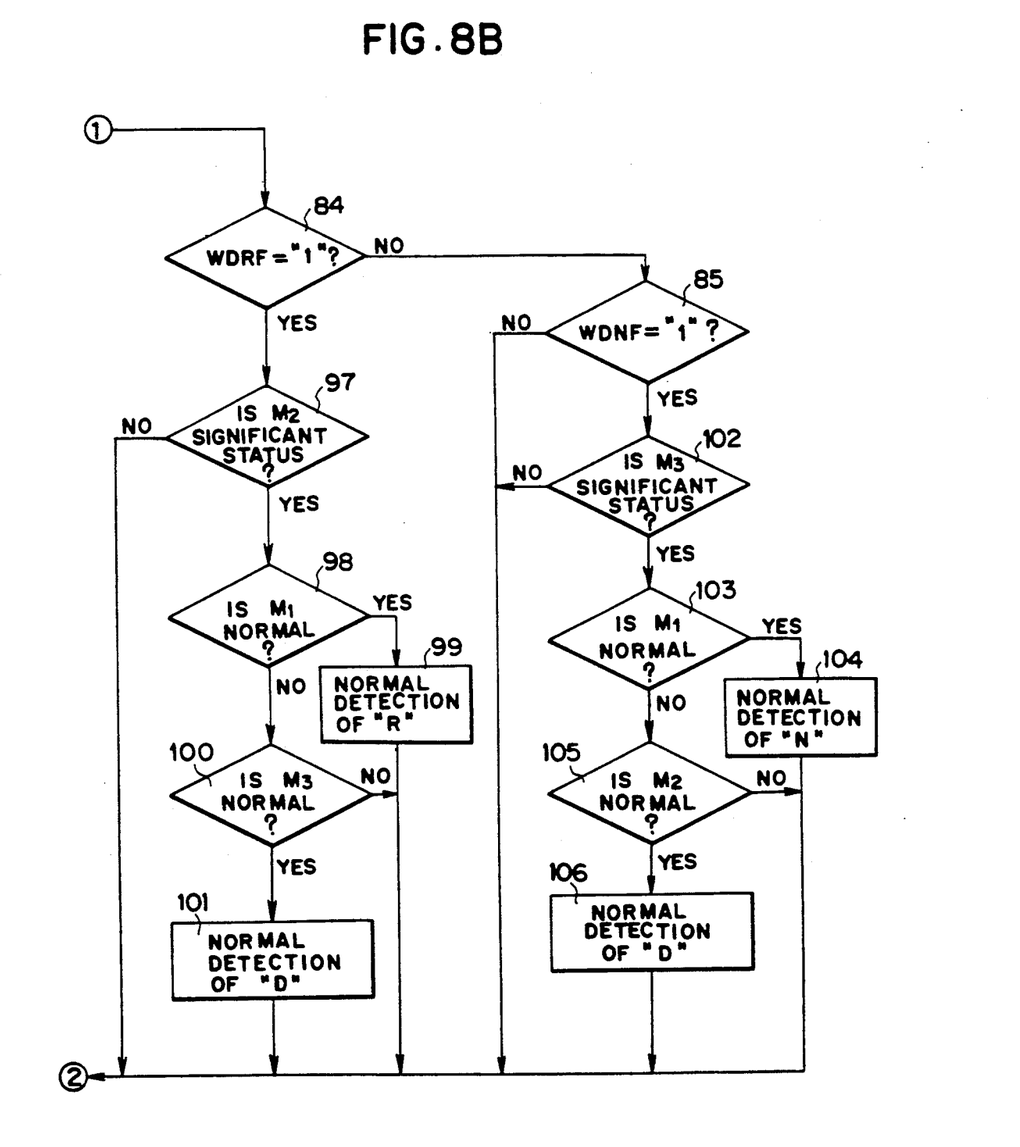

Explanation will now be given to the flowchart showing the malfunction discrimination program 80 shown in FIGS. 8A and 8B. The malfunction discrimination program 80 is also executed at appropriate time intervals, for example, at predetermined constant time intervals after the start of the execution thereof, and the operation first moves to step 81, wherein the data $M_1$ to $M_3$ are read in. Then, determination is made in steps 82 to 85 as to whether or not the flags NOF, WNRF, WDRF and WDNF are in set condition, respectively.

Description is given of the case where the flag NOF is in set condition. In this case, the determination in step 82 is YES and the operation moves to step 86, wherein determination is made as to whether or not the significant data at that time is the first data $M_1$. The determination in step 86 is YES when the first data $M_1$ is in its significant state and the operation moves to stem 87 where it is indicated that the detection for the D position is being carried out normally. Then, the execution of this program 80 is determined. The operation moves step 88 when the determination in step 86 is NO, and determination is made in step 88 as to whether or not the second data $M_2$ is in its significant state. The determination in step 88 is YES when the second data $M_2$ is in its significant state, and it is indicated in step 89 that the detection for the N position is being carried out normally. Then, the execution of this program 80 is terminated. When the determination in step 88 is NO, the operation moves to step 90 wherein the determination is made as to whether or not the third data $M_3$ is in its significant state. The determination in step 90 is YES when the third data $M_3$ is in its significant state, and it is indicated in step 91 that the detection for the R position is being carried out normally. Then the execution of this program 80 is terminated.

As described above, in the case where the flag NOF is in set condition, it is possible to know which position is normally detected by the signal generator 4 by monitoring which data is in a significant state. Since the program 80 is repeatedly executed at relatively short time intervals, all of the determinations in step 86, 88 and 90 will be executed when the states of the voltage signals output from the signal generator 4 vary, so that it can be discriminated which position of the selector lever 2 is detected normally.

Description is given to the case where the flag WNRF is in set condition. In this case, the determination in step 83 is YES and the operation moves to step 92 wherein determination is made as to whether or not the data in a significant state at that time is the first data $M_1$. The determination in step 92 is YES when the first data $M_1$ is in its significant state and the operation moves to step 93 wherein determination is made as to whether or not the second data $M_2$ is in its significant state. The determination in step 93 is YES when the second data $M_2$ is in its significant state and the operation moves to step 94 wherein it is indicated that the detection for the R position is being carried out normally. Then, the execution of this program 80 is terminated. The operation moves to step 95 when the determination in step 93 is NO, and determination is made in step 95 as to whether or not the third data $M_3$ is in its significant state. The determination in step 95 is YES when the third data $M_3$ is in its significant state, and it is determined in step 96 that the detection for the N position is being carried out normally. Then, the execution of this program 80 is terminated. The execution of this program 80 is terminated when the determination in step 92 or 95 is NO.

As described above, in the case where the flag WNRF is in a set condition, it is possible to know which position between N and R is detected normally by the signal generator 4 on the basis of the changes in the voltage signals from the signal generator 4.

The description is given to the case where the flag WDRF is in a set condition. In this case, the determination in step 84 is YES and the operation moves to step 97 wherein determination is made as to whether or not the data in a significant state at that time is the second data $M_2$. The determination in step 97 is YES when the second data $M_2$ is in its significant state and the operation moves to step 98 wherein determination is made as to whether or not the first data $M_1$ is in its significant state. The determination in step 98 is YES when the first data $M_1$ is in it significant state, and it is indicated in step 99 that the detection for the R position is being carried out normally. Then, the execution of this program 80 is terminated. The operation moves to step 100 wherein determination is made as to whether or not the third data $M_3$ is in its significant state when the determination in step 98 is NO. The determination in step 100 is YES when the third data $M_3$ is in its significant state, and it is indicated in step 101 that the detection for the D position is being carried out normally. Then, the execution of this program 80 is terminated. The execution of this program 80 is also terminated when the determination in step 97 or 100 is NO.

As described above, in the case where the flag WDRF is in a set condition, it is possible to know which position between D and R is detected normally by the signal generator 4 on the basis of the change in the voltage signals from the signal generator 4.

The description is given to the case where the flag WDNF is in a set condition. In this case, the determination in step 85 is YES and the operation moves to step 102 wherein determination is made as to whether or not the data in a significant state at that time is the third data $M_3$. The determination in step 102 is YES when the third data $M_3$ is in its significant state, and the operation moves to step 103 wherein determination is made as to whether or not the first data $M_1$ is in its significant state.

The determination in step 103 is YES when the first data $M_1$ is in its significant state, and the operation moves to step 104 wherein it is indicated that the detection for the N position is being carried out normally. Then, the execution of this program 80 is terminated. The operation moves to step 105 wherein determination is made as to whether or not the second data $M_2$ is in its significant state when the determination in step 103 is NO. The determination in step 105 is YES when the second data $M_2$ is in its significant state, and it is indicated in step 106 that the detection for the D position is being carried out normally. Then, the execution of this program 80 is terminated. The execution of this program 80 is also terminated when the determination in step 85, 102 or 105 is NO.

As described above, in the case where the flag WDNF is in a set condition, it is possible to know which position between D and N is normally detected by the signal generator 4 on the basis of the change in the voltage signals from the signal generator 4.

What is claimed:

1. An automatic transmission system in which a gear-shifting operation of a transmission is automatically carried out, said system comprising:

a setting member for setting a gear-shifting mode of the transmission, generating means comprising a plurality of elements coupled with said setting member for generating electric information indicating an operation condition of said setting member, each of the elements producing a significant state of electric information only when said setting member is in a position corresponding to the element;

malfunction detecting means for detecting whether or not there is a malfunction in said generating means, said malfunction detecting means comprising determination means for determining whether or not each element is producing it significant state, first means responsive to the determination means for detecting that a plurality of the elements are producing significant electric information at the same time, and second means responsive to the determination means for detecting that none of the elements is producing significant electric information;

discriminating means for discriminating a nature of a malfunction in response to change in the electric information;

output means responsive to said generating means, malfunction detecting means and discriminating means for providing a mode signal indicative of a mode of the gear-shifting operation; and a control unit responsive to said output means for carrying out a gear-shifting operation of the transmission in a gear-shift mode according to the mode signal.

2. A system as claimed in claim 1, wherein said elements are switches.

3. A system as claimed in claim 1, wherein said discriminating means comprises first identifying means responsive to the determination means and the first means for identifying the element which always produces significant electric information during the time said setting member is operated, and a second identifying means responsive to the determination means and the second means for identifying the element from which significant electric information is not produced during the time said setting member is operated.

4. A system as claimed in claim 3, wherein said elements are switches.

5. A system as claimed in claim 3, wherein said output means comprises a data generator responsive to the electric information of said setting member, a back-up data generator responsive to the second identifying means for generating a second signal indicative of a gear-shift mode matched to a malfunction condition identified by the second identifying means, and switching means responsive to the second means for selectively providing the first or second signal as the mode signal.

6. A system as claimed in claim 5, wherein said elements are switches.

7. A system as claimed in claim 5, wherein said output means further comprises gate means responsive to the first identifying means for supplying only correct electric information to the data generator.

8. A system as claimed in claim 2, wherein said elements are switches.

* * * * *

UNITED STATES PATENT AND TRADEMARK OFFICE
CERTIFICATE OF CORRECTION

PATENT NO. : 5,090,269

DATED : February 25, 1992

INVENTOR(S) : Ohtsuka, et al.

It is certified that error appears in the above-identified patent and that said Letters Patent is hereby corrected as shown below:

Column 13, line 21, after "claimed" insert --is--

Column 13, line 40, change "it" to --its--

Column 14, line 30, after "information" insert --for generating a first signal corresponding to the operation--

Column 14, line 44, change "2" to --7--

Signed and Sealed this

Fourteenth Day of July, 1992

*Attest:*

DOUGLAS B. COMER

*Attesting Officer*     *Acting Commissioner of Patents and Trademarks*